H. B. HARTMAN.
OZONE WATER PURIFYING APPARATUS.
APPLICATION FILED JAN. 24, 1920.
1,363,589.   Patented Dec. 28, 1920.
7 SHEETS—SHEET 3.
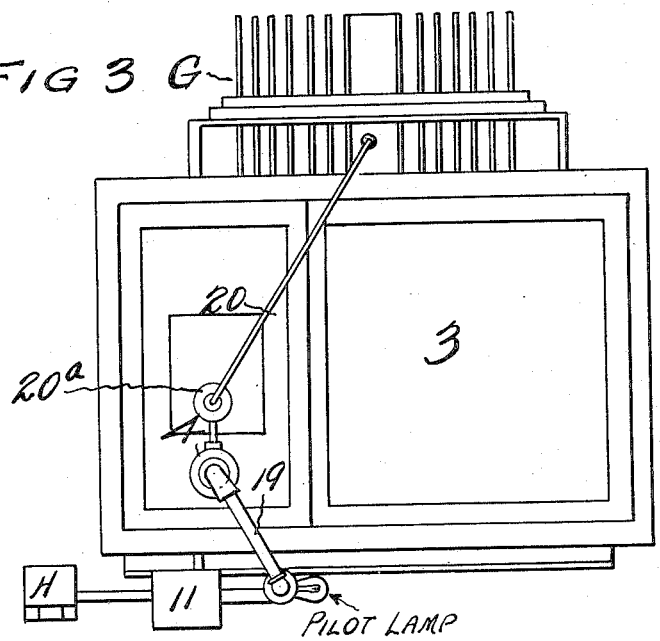
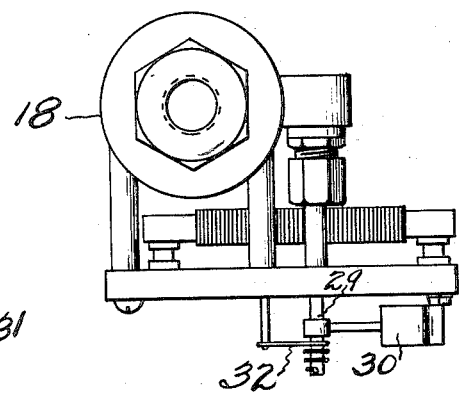
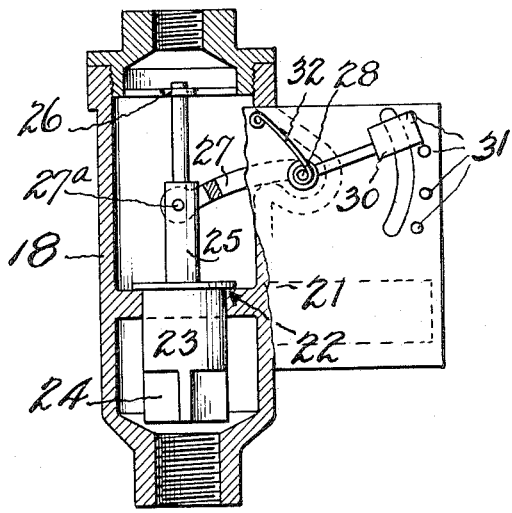
Inventor
HARRY B. HARTMAN
By
Attorney

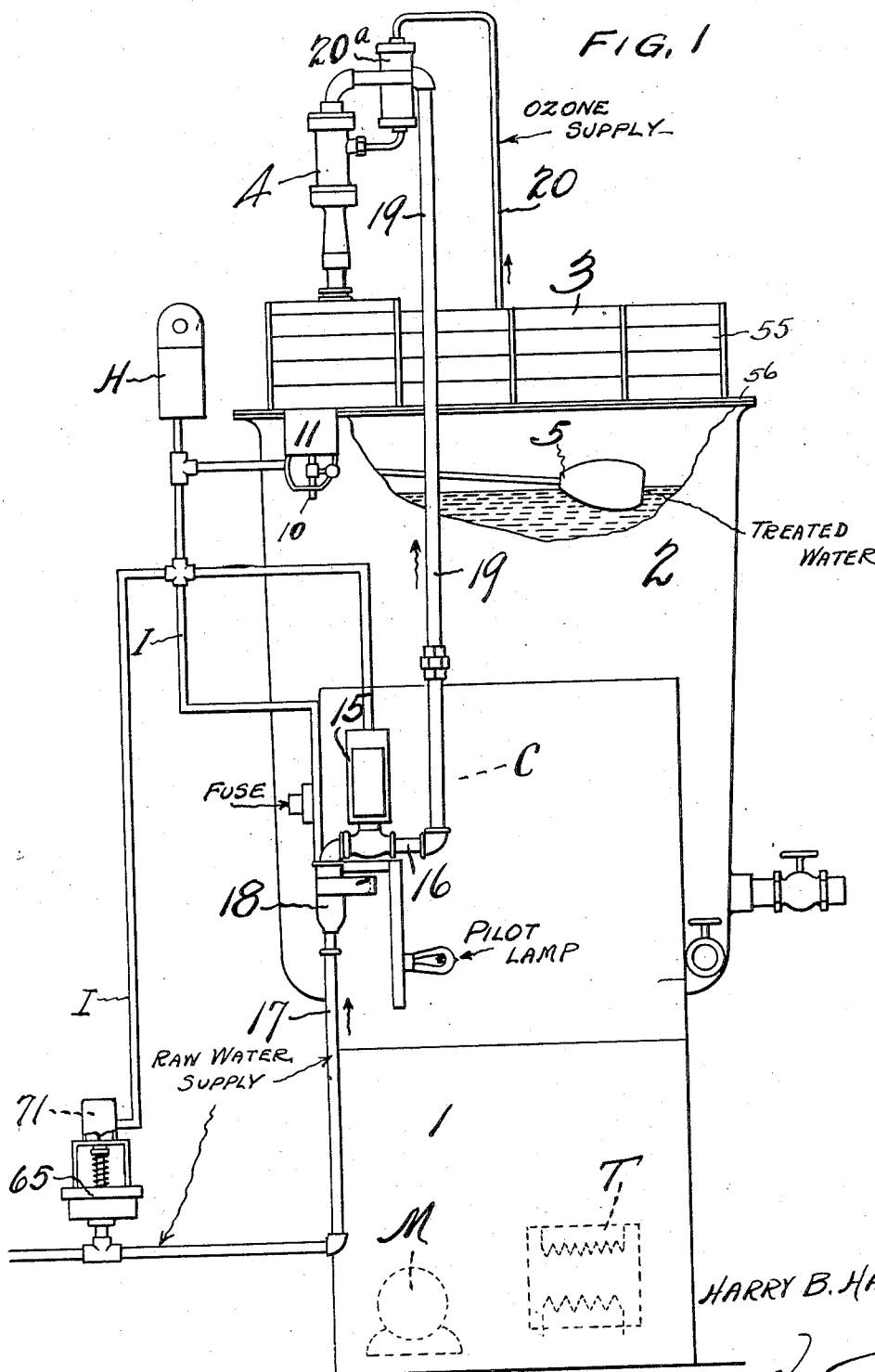

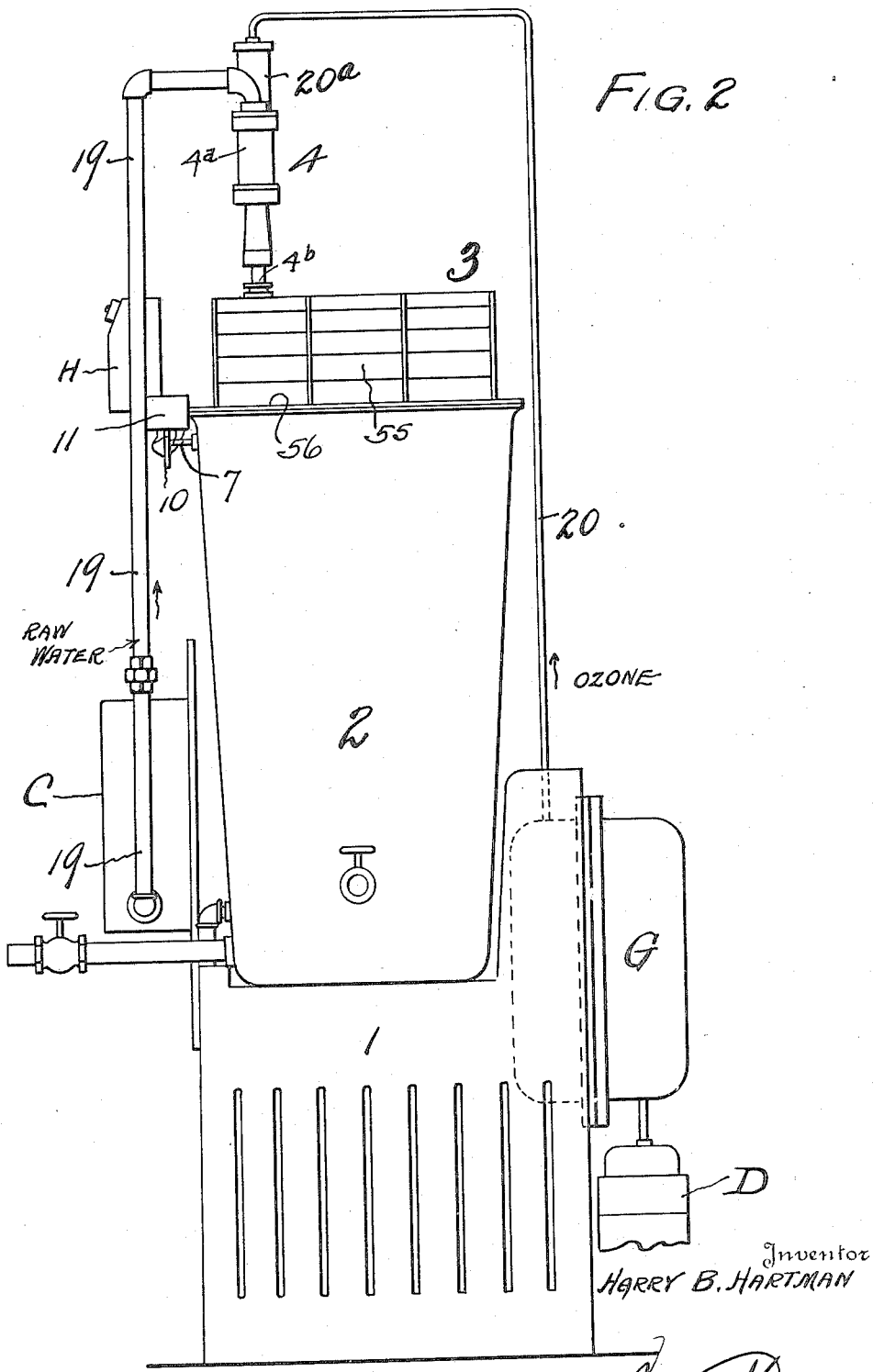

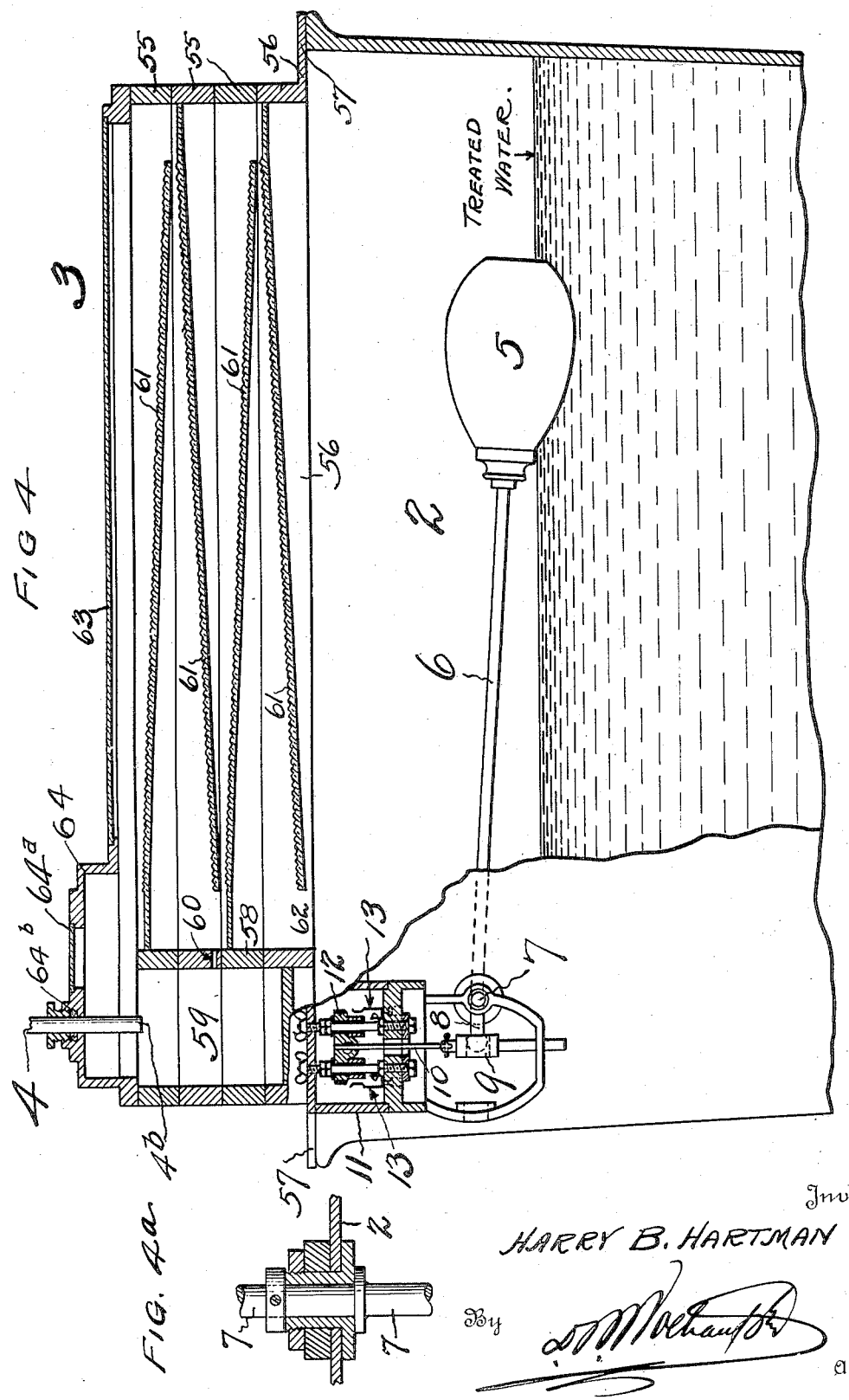

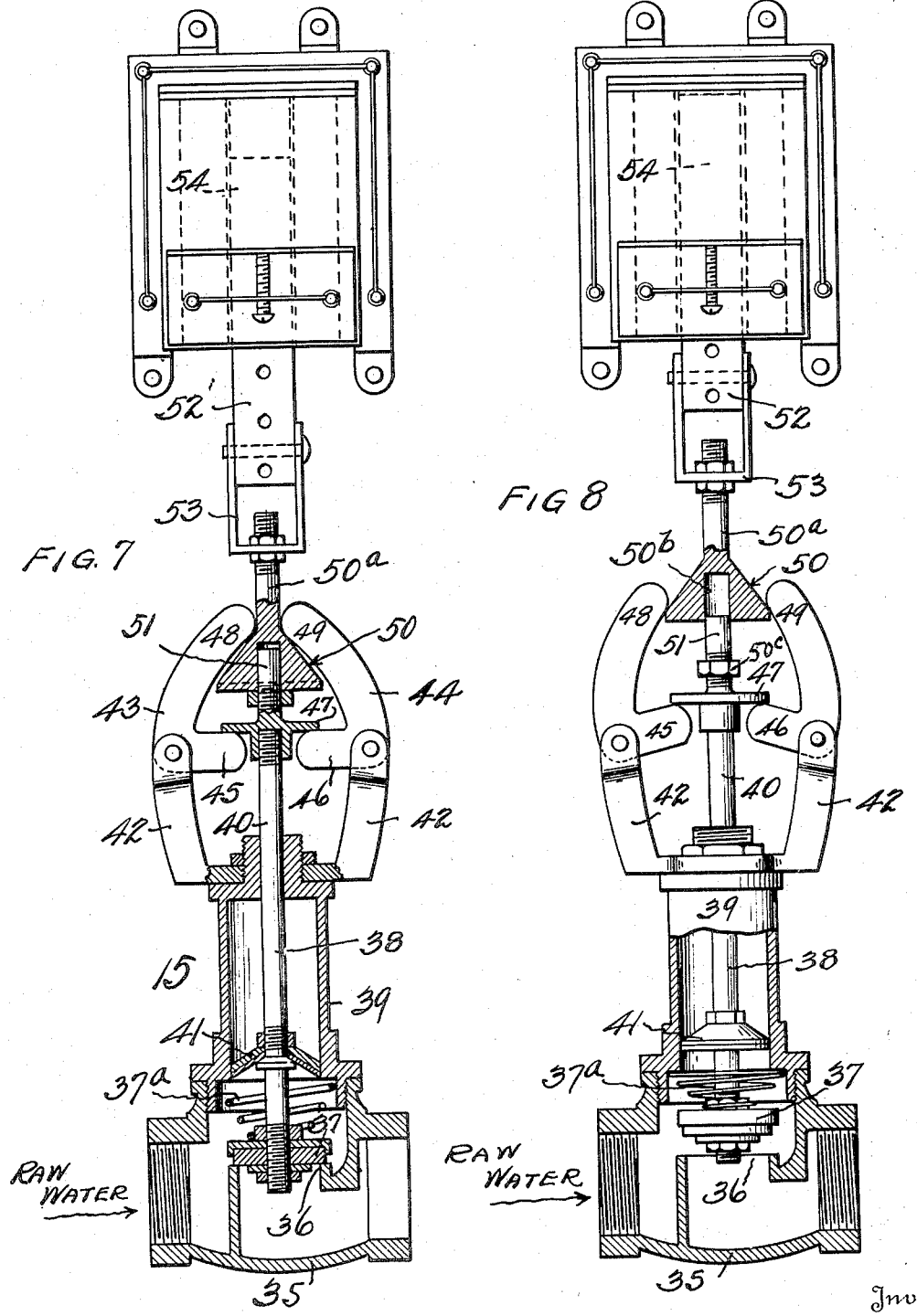

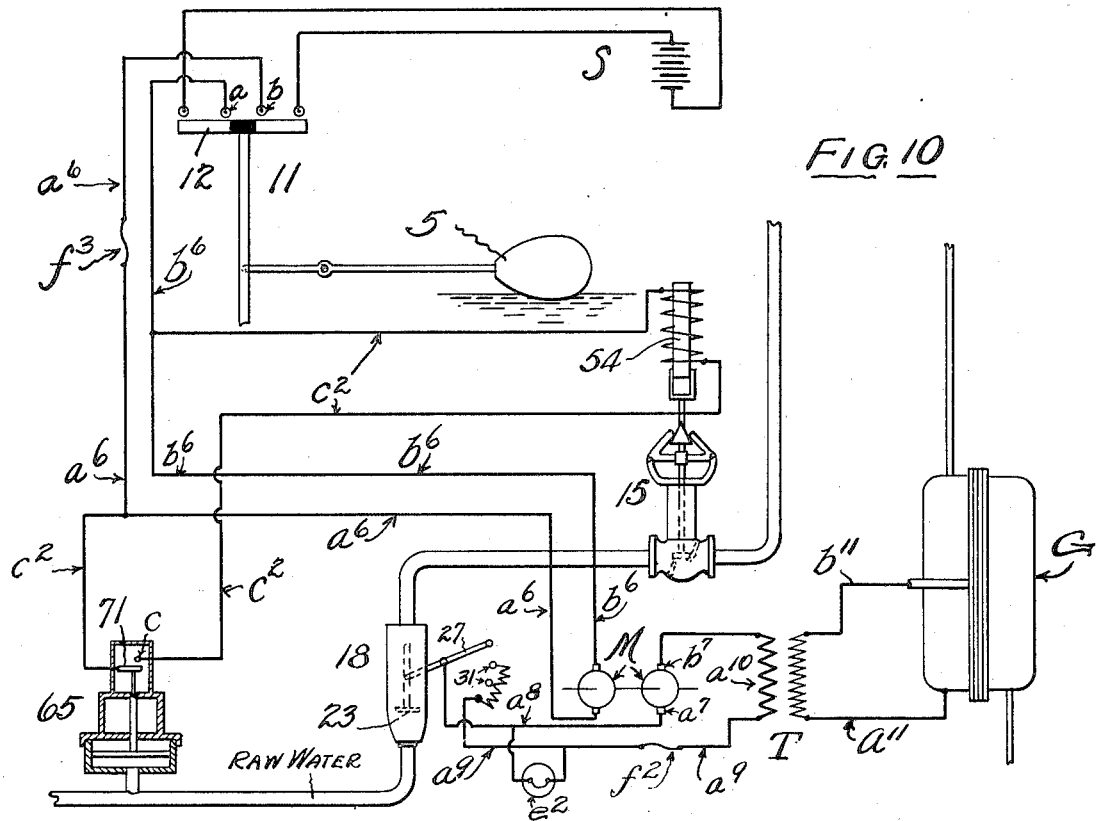

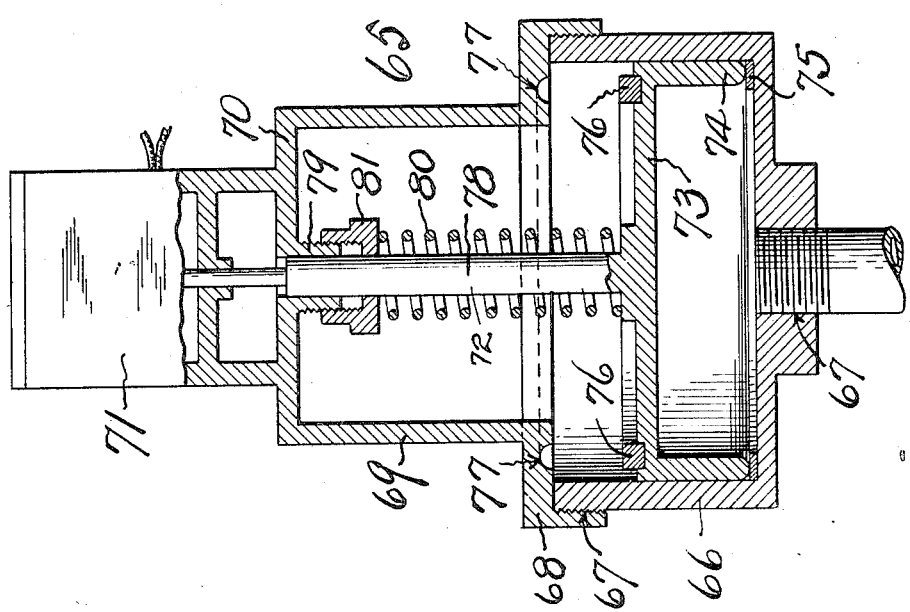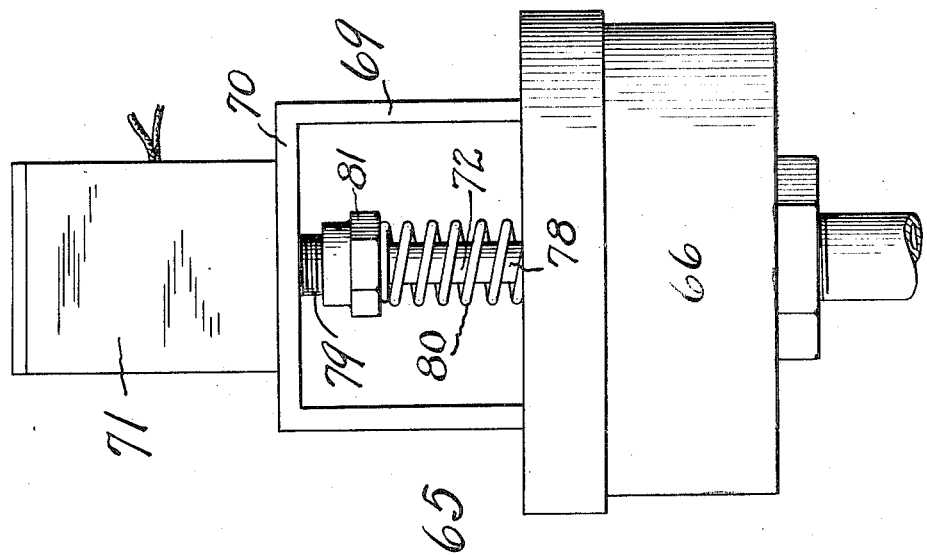

UNITED STATES PATENT OFFICE.

HARRY BUXTON HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

OZONE WATER-PURIFYING APPARATUS.

1,363,589.

Specification of Letters Patent. Patented Dec. 28, 1920.

Application filed January 24, 1920. Serial No. 353,857.

*To all whom it may concern:*

Be it known that I, HARRY B. HARTMAN, citizen of the United States, residing at Scottdale, in the county of Westmoreland and State of Pennsylvania, have invented certain new and useful Improvements in Ozone Water-Purifying Apparatus, of which the following is a specification.

This invention relates to the general subject of water purification, and has special reference to a novel apparatus for treating raw water with ozone.

To this end the present invention contemplates a machine of a more or less portable nature that will provide a complete water purifying plant for schools, hotels, restaurants and the like adapted to furnish an unlimited supply of pure water for drinking purposes. Frequently, in cities and towns without municipal water purifying plants, the water has disagreeable tastes, odors, and often contains considerable coloring matter along with harmful bacteria which renders it dangerous for personal use. Therefore, one of the primary objects of the present invention is to provide a machine for bringing an oxidizing agent such as ozone properly into contact with the raw water for the purpose of eliminating deleterious matter and rendering the same safe for all uses in a thoroughly practical and efficient manner.

A further object of the invention is to provide a plant which is composed of a plurality of unit parts that may be readily multiplied when desired to meet any desired capacity, and in this connection it is proposed to so arrange the several units as to act or operate automatically in conjunction with each other to control the supply of raw water, the generation of the ozone, and the mixing of the two together.

A further object of the invention is to provide a device wherein the supply of purified water automatically controls the operation of the machine. That is to say the present invention is particularly directed to that type of apparatus wherein the change in level of the purified water in the storage tank will automatically set the proper instrumentalities into operation to replenish the diminished supply, thus insuring an ample reserve of purified water that is readily available for use.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a front elevation of the apparatus.

Fig. 2 is a side elevation thereof.

Fig. 3 is a top plan view.

Fig. 4 is an enlarged detail vertical sectional view, partly in elevation, of the upper portion of the storage tank and the baffle unit, the main switch also being shown.

Fig. 4$^a$ is a detail view of the float mounting.

Fig. 5 is an enlarged detailed view partly in section of the switch valve.

Fig. 6 is a top plan view of the valve shown in Fig. 5.

Figs. 7 and 8 are detail sectional views of the solenoid operated raw water control valve, respectively in closed and open position.

Fig. 9 is a diagram of the electrical circuits of the machine when an alternating current is available for use.

Fig. 10 is a diagram of the circuits involved to convert direct current into alternating current.

Fig. 11 is an elevation of the pressure responsive valve in the raw water line.

Fig. 12 is a vertical sectional view of the valve shown in Fig. 11.

Similar reference characters designate corresponding parts throughout the several figures of the drawings.

In carrying the present invention into effect it is proposed to assemble the various operative units in as compact form as possible with a view to economizing space and reducing the general bulk of the apparatus to a minimum, thereby particularly adapting the entire device for the uses heretofore set forth while at the same time facilitating handling and installation.

Accordingly, as will be observed from Fig. 1 of the drawings, a suitable base or stand 1 is provided, the same conveniently constituting a housing for a rotary converter M and a transformer device T, the former being employed when the machine is installed in a location where direct current only is available to convert the same into alternating current for use in connection with the ozone generator G, while the transformer T serves to increase the voltage for carrying out the generating action in the ozone generator. As shown in Fig. 2 the said ozone generator G is also mounted upon the base or stand 1 and has associated therewith an air drier or dehydrator D.

Mounted upon the stand in any suitable or convenient manner is a storage tank or reservoir 2 for receiving and holding a supply of purified water which has been thoroughly subjected to the ozone treatment. The said reservoir is preferably closed at the top to exclude foreign matter and prevent contamination of the water, and in this connection it is to be observed that the novel baffle unit 3 may advantageously constitute the cover or closure for the top.

The said baffle units 3 constitutes one of the novel and distinctive features of the invention and its interior construction will be referred to later in detail, it being understood at this point that the same receives the full charge of raw water and ozone discharged from the pressure mixing device 4 in such a manner that the ozone gas will be temporarily held in check over a surface of extended area so as to permit the water, which is discharged simultaneously therewith into the unit, to move through relatively dense stratas or clouds of the ozone on its way to the storage tank 2. That is to say, since the ozone is considerably heavier than air and has a tendency to settle and collect over inclosed surfaces the invention proposes to provide this baffle unit to hold the gas in check over a relatively large surface so that the water must move through the ozone during its relatively long travel to the tank 2, and thereby prolong the contact of the raw water with the ozone in order that the latter may have its full oxidizing effect.

The level of purified water within the storage tank or reservoir 2 is relied upon to set the necessary devices into operation to maintain a substantially uniform quantity of purified water always available for use. To this end it is proposed to provide a float 5 within the storage receptacle, the same being carried by the arm 6 having an angularly disposed and exteriorly projecting shaft portion 7 fitted with a spur for engaging a shifter yoke 9 carried by the stem 10 of a main switch device 11 which is preferably of the type shown in my former Patent No. 1,255,531 dated February 5, 1918, and essentially comprises a switch block 12 that may be shifted by the upper end of the stem 10 in such a manner as to bridge the contacts 13—13 (Fig. 4,) and close an electrical circuit. This circuit includes a magnetic flow-control valve designated generally as 15 and located in the horizontal section 16 of the raw water supply line 17, and posterior to the switch valve 18 which is also located in the raw water supply line referred to. When the level of purified water in the tank 2 drops, the float 5 drops and actuates the main switch 11 to thereby close the circuit through the electrical operating means for the magnetic flow control valve 15 so as to open the valve and thus permit raw water under pressure from the pipe 17 to flow through the pipe section 16 to the vertical pipe 19 and thence to the mixer 4, wherein the discharged water creates a suction acting to draw the ozone from the ozone generator G through ozone supply line 20 which has the glass trap 20ª interposed therein and adjacent the intake port of the mixer, to thereby prevent water which might possibly back up in the mixing chamber of the device 4 from entering the line 20 and making its way to the electrical elements of the ozone generator. This trap therefore constitutes a safety device for protecting the line 20 and generator against accidental entrance of water.

When the flow control valve 15 is open to permit raw water to flow through the line 17 and 19, the switch valve 18 shown in detail in Figs. 5 and 6 is unseated and lifted to thereby control the current supplied to the ozone generator so that the generation of ozone will be directly in proportion to the rate of water flow.

As will be observed from Figs. 5 and 6 the said switch valve 18 essentially comprises a casing 21 having an interior valve seat 22 normally closed by the enlarged portion of the valve body 23 whose lower end is fluted as at 24 while its upper end carries a stem 25 that is preferably guided in the spider 26 to insure perpendicular movement for the purpose of accurately operating the switch arm 27 connected thereto at 27ª. This switch arm is fulcrumed in a portion of the valve casing 21 as indicated at 28 and carries an exteriorly projecting portion 29 having fitted thereto a shiftable switch block 30 adapted to be moved over the resistance contacts 31 from a point of maximum resistance to a point of zero resistance as the valve is elevated by the pressure of raw water flowing through the supply line. For the purpose of insuring the return of the shiftable switch block 30 to its normal position of maximum resistance a return spring 32 may be utilized as shown in Figs. 5 and 6.

The switch valve 18 above referred to is interposed in the raw water line leading to the mixer 4 and baffle unit 3 and as previously indicated, its purpose, is to control the current flow to the generator and thereby control or hold back the current and prevent a sudden inrush thereof to the generating elements of the generator so as to thereby eliminate the possibility of rupture or puncture of the "dielectrics" or relatively thin sheets of insulation, while at the same time automatically causing the operation of the generator to cease when the flow of water is cut off from the supply line. It will thus be apparent that the resistance switch valve 18 is a safety device that performs the important function of protecting the operative elements of the generator, and on the other hand is so designed as to be readily responsive to the flow of water in the supply line to thereby insure the proper feed of current to the generator.

The magnetic flow control valve 15 is preferably of the type shown in Figs. 7 and 8 of the drawings, wherein it will be observed that the same embodies in its organization a valve casing 35 having an interior valve seat 36 normally closed by the valve head 37 carried by a stem 38 which extends upwardly through the cylinder top 39 of the valve and projects exteriorly thereof as indicated at 40. For the purpose of balancing the valve in its operation to offset the conditions of superposed weight and water pressure, the same is preferably fitted at its intermediate portion with the plunger 41 operating within the cylindrical top 39 and exposed to the pressure of water on the entrance side of the valve seat 36. And, to assist in holding the said valve 37 on its seat against the line pressure a spring 37ª may be arranged between the lower end of the part 39 and the upper side of the valve head.

The upper end of the top 39 is fitted with a suitable bracket 42, having mounted therein a pair of angular levers 43 and 44 whose lower arms 45 and 46 are adapted to engage beneath the disk 47 carried by the end 40 of the valve stem while the upper arms 48 and 49 are adapted to engage with the conical outer surface 50 of the lost-motion connection 50ª which has a socket 50ᵇ for receiving the upwardly projecting stem portion 51 of the disk 47. The purpose of this type of connection is to permit the valve 37 to be unseated quickly and positively under the action of the solenoid controlled member 52 which is attached to the lost-motion connection 50ª by means of the adjustment coupling 53 said member 52 being operated by the conventional solenoid helix 54. And, on the other hand when the solenoid control member 52 drops upon the deënergization of the solenoid the valve head 37 will be permitted to readily fall to its seat under the weight of the valve parts and influence of the spring 37ª after being slightly accelerated in its downward movement by the dropping of the conical member 50 against the nut 50ᶜ on the upwardly projecting portion 51 of the disk 47.

The switch valve 18 and the magnetic flow control valve 15 constitute two important features of the invention since they operate as a safety device and a check respectively against the malfunctioning of the apparatus, as in the event of current failure, and to also prevent inrush of current to the electrical elements of the generator. That is to say in the case of current failure the flow control valve will automatically drop or close to prevent raw water from passing into the reservoir of the receptacle, while upon the cessation of water flow the switch valve also immediately cuts off supply of electrical current to the ozone generator.

After the raw water has passed through the flow control valve it proceeds through pipe section 19 to the mixer device 4 which may be of any desired construction but preferably of the type shown in my co-pending application Serial No. 353,860 filed January 24, 1920, and connected with the ozone supply line 20 from the ozone generator. As the raw water passes through the mixing device 4 it creates a vacuum which draws ozone into contact with the water in the relatively enlarged portion 4ª of the device prior to its discharge through the outlet 4ᵇ into the baffle unit shown in Fig. 4, and thus the water is first brought into contact with the ozone in the mixer 4 but to insure a positive and more prolonged treatment of the water, it, together with the ozone, is passed through the baffle unit 3.

By reference to Fig. 4 it will be observed that the baffle unit preferably consists of a casing formed of a plurality of riffle carrying sections 55 and 56 the section 56 being the base section which may be provided with a flange 57 for entirely sealing the upper edge of the storage tank 2. The said casing is divided off into two compartments by an upright partition 58 disposed near one end of the casing to provide at such end a well 59 closed at the bottom, open at the top and having an outlet 60 through the said partition into the large compartment. The said larger compartment of the casing, is in open communication with the top of the tank 2 and with the upper part of the casing itself and contains therein a plurality of inclined fluted or ribbed riffle plates 61 arranged in staggered order one beneath the other so that each succeeding riffle plate will be inclined in a reverse direction from the riffle plate above it. Each of the casing sections 55 and 56 preferably carries one of the riffle plates and it will be observed that each inclining riffle plate terminates short of one end of the casing, so as to deliver water onto the higher end of the next lower riffle plate, and the lowermost riffle plate terminates short of the partition 58 to provide a delivery opening 62 which opens into the storage tank 2.

By reason of this construction the water and ozone will be compelled to follow a tortuous path of maximum extent and area in making their way from the point of entrance to the baffle unit to the discharge opening 62 thereof.

The baffle unit has fitted thereto a cover 63 preferably of glass, and at one end thereof has a trap section 64 having an inspection window 64$^a$ and also means 64$^b$ for receiving the discharge end of the mixing device 4 in an air tight manner. Thus, it will be apparent that the mixer 4 discharges directly into the well 59 located at one end of the baffle unit casing. The water and ozone are discharged into the well 59 until a sufficient quantity accumulates to overflow onto the top ones of the riffles 61, from whence it will flow to the far end of the riffle beneath, and so on until the last riffle plate has been traversed thus insuring the treatment of the water with the ozone to a maximum extent, as the ozone hangs on and about the plates and necessitates the passage of the water through an atmosphere of ozone for its entire path of travel through the baffle unit.

An important feature in connection with the baffle unit is the provision of the well 59 which always holds a supply of pure water to the level of the aforesaid bleed hole or vent 60 located at substantially half the depth of the well. When the combined water and ozone is not being discharged from the mixer 4, the treated water within the well will leak out through the vent or bleed hole to the level thereof, thus insuring that the well will be filled to at least half of its capacity to constitute a reserve supply when the apparatus is started up again so that in event any raw water is discharged from the mixer 4 it will not only become mixed with the reserve quantity held in the reservoir, but at the same time due to the additional depth to which the well must be filled before any considerable quantity of the water passes from the edge of the well on to the upper baffle plate, the apparatus will have had ample opportunity to bring sufficient quantity of ozone into the mixer to insure the proper treatment of the water. The unfilled portion of the reservoir 59 therefore operates as a check upon raw water being supplied to the tank since the time required to fill the well from the level of the bleed hole to overflow capacity will be more than sufficient to cause the proper quantity of ozone to be lifted from the ozone generator and into the mixer.

Accordingly, it will be apparent that the well 59 constitutes an important part of the present apparatus and is essential to the proper and safe functioning thereof. The baffle unit 3 of which the well 59 is a part also materially contributes to the purifying action of the ozone on the water, because it is arranged in feeding relation to the reservoir 2, and therefore retards the progress of the ozone and water discharged into the well to a considerable extent before the purified water is emptied into the reservoir itself.

The ozone generator G, which is connected with the mixer 4 through the medium of the conduit 20 of non-oxidizing material, is electrically connected with the switch valve 18 in such a manner that when the said valve is lifted the alternating current from the transformer T will be permitted to flow to the generator and cause the necessary electrical action therein to produce the ozone. Because of the provision of the switch valve 18, ozone will only be generated when raw water is flowing through the supply line 17—19, so that the volume of water flow and volume of ozone to be mixed in the mixer 4 and baffle unit 3 are automatically coördinated in the proper portions.

Another important and practical feature of the present apparatus, is the provision of means for automatically opening the electrical circuit in which certain of the electrical operating instrumentalities are included, to prevent the useless waste of current and the overheating of the solenoid of the flow-control valve 15, in event that the supply of raw water is cut off before it reaches the resistance switch valve 18 and the flow control valve 15. That is to say, it is proposed to equip the present apparatus with a novel automatic valve device 65 which may be readily set to meet the range of pressure in the raw water supply line anterior to the entire apparatus so that in event the supply of raw water is cut off at a point relatively distant from the machine for instance, and the float 5 in the reservoir 2 is in a lowered position on account of a relatively low level of purified water being in the reservoir, the current to the solenoid 54 of the valve 15 will be shut off. In some installations of the machine, as in factories or the like where the entire water supply is cut off over night or for a longer period of inactivity, it may happen that the source of supply is cut off while the machine is in operation due to a low level of purified water existing in the reservoir 2. Owing to the presence of the resistance valve 18 in the line however it will be apparent that the circuit to the generator will be opened immediately upon the cessation of the flow in the raw water line, but since the flow of current to the solenoid 54 of the valve 15 is controlled by the level of liquid in the reservoir 2, current would continue to flow from the source S to the solenoid because the main switch 11 would be closed due to the lowered position of the float in the reservoir. Accordingly in order to insure against such a condition which may be encountered in some places where the machine is used it is proposed to provide a valve 65 in the raw water supply line 17 which will be accurately responsive to the pressure in the line to thereby control a switch included in the solenoid circuit, as will be clearly apparent from the wiring diagram Fig. 9 to be presently referred to in detail.

In connection with the valve 65 it is to be observed that the same preferably includes in its organization a cupped valve body 66 having a port 67 in open communication with the raw water supply line. The outer upper edge of the cupped body 66 is exteriorly threaded as at $67^a$ to receive the threaded collar 68 of a stem-guide frame or yoke 69 which carries on the upper transverse member 70 thereof a suitable switch device 71 that is adapted to close an electrical circuit when the plunger device designated generally as 72 of the valve is held in an elevated position by the pressure of water in the supply line. When the pressure in the line drops the plunger device 72 will also fall to thereby permit the switch 71 to automatically open the circuit which includes the solenoid 54 of the valve 15.

A distinctive feature of the valve 65 is the plunger device 72 which comprises a cupped piston or plunger head 73 whose lower end 74 is adapted to seat upon a rubber or equivalent gasket 75 on the floor of the valve body 66 to make a water tight joint at this point, while the upper or exposed side thereof carries a rubber or equivalent ring or gasket 76 which is adapted to fit into a groove 77 on the underside of the frame 69 when the plunger is raised to provide a fluid seal at the head of the plunger. As will also be observed from Figs. 11 and 12 of the drawings the stem 78 of the plunger is guided in the tubular boss 79 of the frame to thereby accurately engage the operating arm of the switch 71 which projects exteriorly of the switch casing; and, for the purpose of placing the plunger head 73 under the desired tension to meet the number of pounds pressure in the line, a spring 80 is confined between the upper side of the plunger head 73 and a nut 81 adjustable on the threaded exterior of the tubular boss 79. It will therefore be apparent that by simply adjusting the nut 81 on the boss or tension of the spring 80 may be varied to accurately adjust the lifting effect of the piston to the line pressure.

As previously indicated the valve 65 is intended to be placed in the raw water supply line at a point anterior to the resistance and flow control valves of the apparatus to be independently responsive to pressure and flow of raw water in the supply line so that in case the supply of raw water is cut off the plunger thereof will drop and thereby cause the switch 71 to be actuated and open the solenoid circuit.

Referring now more in detail to the circuits of the apparatus, reference may be made to Figs. 9 and 10 of the drawings, the former illustrating the circuits involved where an alternating current is available for use in the machine, while the latter indicates the circuits involved where it is necessary to convert direct current to alternating current in order to obtain the proper electrical action in the ozone generator.

In Fig. 9 the float controlled main switch 11 is shown connected with a source of electrical energy S, and when the switch block 12 is shifted by the downward movement of the float 5 the circuit is closed from the said source S to the terminals $a$—$b$ of the operating circuit of the machine. The terminals $a$ and $b$ are connected with the line wires $a'$—$b'$, the former leading to wire $a^2$ connected with the switch 71 of the pressure valve 65 and the latter leading to the wire $b^2$ connected to one of the terminals of the solenoid 54 of the flow control valve 15 in the raw water line. The terminal $c$ of the switch 71 is connected with the other terminal of the solenoid 54 by means of the line $c'$. It will therefore be apparent that before current can make its way from the source S to the solenoid 54 that the valve 65 must close the switch 71 so that the circuit may be completed through the lines $a'$—$a^2$—$c'$, the solenoid 54, line $b^2$ and $b'$.

The main current supply line $a'$—$b'$ after passing the shunt circuit, which includes the electrical devices of the valves 15 and 65, continues on to one of the windings $a^3$ of the transformer T and the resistance elements of the switch valve 18. That is, while the ultimate destination of the lines $a'$—$b'$ is the winding $a^3$ of the transformer T, the line $b'$ preferably includes the resistance elements 31 which may be cut out through the movement of the switch arm 27 under the influence of the shifting movement of the valve member 23 of the switch valve device. And, as shown in the diagram a fuse $f$ may be placed in the line $b'$ anterior to the resistance elements to protect the same against abnormal current fluctuations, and at the same time also protect the winding $a^3$ of the transformer T. For the purpose of visually indicating the passage of current through the lines $a'$—$b'$ to the transformer T a pilot circuit $d$ is preferably placed across these lines, the same including an electrical lamp $e$. The winding $a^4$ of the transformer T is grounded to the machine frame of the generator as indicated in the diagram through the line $a^5$, and is also connected with conductor plug $p$ of the generator through the line $b^3$. It will thus be apparent when an alternating current is used, no converter is necessary, the current being supplied from the source direct, to the various electrical operating instrumentalities in the manner prescribed.

Fig. 10 shows the slightly different arrangement necessary in the wiring circuits to accommodate the rotary converter. In this application of the invention direct current from the source S is conducted from the lines $a^6$—$b^6$ to the said rotary converter and also the electrical devices of the valves 65 and 15 since these electrical devices are included in the shunt circuit $c^2$, tapped off from the line $a^6$—$b^6$ as shown in Fig. 10. Thus, alternating current is delivered from the terminals $a^7$—$b^7$ of the converter M respectively to the resistance elements 31 of the resistance switch valve 18 through the circuit connection $a^8$ and is thence led by the wire $a^9$ to the winding $a^{10}$ of the transformer T. A fuse $f^2$ is preferably interposed in the line $a^9$ and a pilot lamp $a^2$ is thrown across the lines $a^8$—$a^9$. Alternating current supplied by the converter M is therefore delivered to the transformer T and from the said transformer it is carried to the generator G through the lines $a^{11}$ and $b^{11}$ respectively. A fuse $f^3$ for protecting the converter M and the solenoid may be located in the line $a^6$ between the terminal $a$ of the main switch 11 and the point where the shunt circuit $c^2$ is tapped off from the line $a^6$.

While the circuits above outlined are of course susceptible of rearrangement to meet various conditions of application in use, the diagram shown illustrates a practical and operative arrangement for utilizing either direct or alternating current.

From the foregoing it will be apparent that the present invention provides an apparatus for generating the ozone to purify the raw water which takes care of practically any condition that may be encountered in installation and use automatically and after once being set and adjusted to meet the requirements of the installation, will automatically function without manual attention. The valve 65 which serves more or less the purpose of a diaphragm valve operates as a check upon the malfunctioning of the flow control valve 15 when the said valve is not responsive to conditions within the machine itself, while the resistance switch valve 18 positively provides for shutting off the current to the generator when the flow of raw water ceases, and also performs the important function of permitting the current to gradually enter the generator on starting to prevent rupture of the dielectric plates due to thermal conditions usually existing at the start of the generating operation. Furthermore it is to be observed that the entire purifying action is controlled through the medium of the main switch 11 which is actuated by the difference in level of treated water stored within the tank or reservoir 2. That is to say, when the main switch 11 is closed by the dropping of the float 5, and assuming that the switch 71 is closed due to the elevation of the plunger in the valve 65, current will pass through to the flow control valve 15 to thereby open up the raw water supply line which leads to the pressure mixing device 4, while at the same time the flow of raw water through the supply line to the mixer will cause the operation of the resistance switch valve 18 to permit electrical current to flow to the generator G.

Without further description it is believed that the features and advantages of the invention will be readily apparent to those skilled in the art, and it will of course be understood, that changes in the form, proportion and minor details of construction may be resorted to without departing from the spirit of the invention or scope of the appended claims.

I claim:

1. An ozone water purifying machine including a storage reservoir for treated water, an ozone generator, an ozone conduit, a raw water supply line, a mixer device arranged at the junction of the ozone conduit and the raw water line and delivering to the storage reservoir, and means controlled by the level of water in the reservoir for synchronously controlling the flow of raw water through the supply line and the functioning of the ozone generator.

2. An ozone water purifying machine including a storage reservoir, an ozone generator, and automatic means for synchronously controlling the flow of raw water and ozone to said reservoir.

3. An ozone water purifying machine including a storage reservoir, an ozone generator, a baffle unit in feeding relation to the reservoir, and means controlled by the level of treated water in the reservoir for supplying raw water and ozone to the baffle unit.

4. An ozone water purifying machine including a storage reservoir, an ozone generator, a baffle unit in feeding relation to the reservoir, a raw water supply line, float controlled means for opening the raw water supply line and simultaneously energizing the ozone generator, and means for discharging the raw water and ozone into the baffle unit.

5. An ozone water purifying machine including a reservoir, an ozone generator, a baffle unit communicating with the reservoir, a mixer device in piped relation to the ozone generator and a source of raw water supply, and float operated means for controlling the supply of raw water to the mixer and for also controlling the generation of ozone in the generator.

6. An ozone water purifying machine including a reservoir, an ozone generator, a baffle unit communicating with the reservoir, a mixer device in piped relation to the ozone generator and a source of raw water supply and discharging into the baffle unit, said baffle unit having a well at one end thereof for receiving the ozone and water discharged from the mixer, and also having a plurality of reversely inclined riffles, and float actuated means for controlling the flow of raw water to the mixer and also for controlling the generation of ozone in the generator.

7. An ozone water purifying machine including a reservoir, an ozone generator a superposed baffle unit including a receiving well at one end and a plurality of inclined baffle plates arranged one above the other and in reversely inclined relation, the upper one of said plates receiving the overflow from the well, and the lower discharging into the reservoir, a mixer device in piped relation to the ozone generator and a source of raw water supply and discharging into the said well, and float actuated means for controlling the flow of raw water to the mixer and also controlling the generation of ozone in the generator.

8. An ozone water purifying machine including a reservoir, an ozone generator, a baffle unit superposed on the reservoir and consisting of a plurality of sections having means for forming at one end of the unit a well and also having at one side of the well a plurality of inclined baffle plates which afford a tortuous passage from the overflow edge of the well to the point of discharge into the reservoir, a mixer device in piped relation to the generator and also in piped relation with the source of raw water supply, and float actuated means controlling the flow of raw water from the source to the mixer and also controlling the generation of ozone within the generator.

9. An ozone water purifying machine including a reservoir, an ozone generator, a baffle unit superposed on the reservoir and including a well and a plurality of baffle plates arranged to receive fluid from the overflow edge of the well and conduct the same over a tortuous path to the reservoir, and one wall of said well being provided with a bleed hole discharging on one of the intermediate baffle plates of the unit, a mixer device in piped communication with the ozone generator and a source of raw water supply, and float actuated means for controlling the flow of water from the source to the mixer and also controlling the generation of ozone within the generator.

10. An ozone water purifying machine including a reservoir, an ozone generator, a baffle unit arranged in feeding relation to the reservoir and having means for accumulating a quantity of purified water before it is discharged onto the baffling elements of the unit, and means for supplying ozone and water to the baffle unit.

11. An ozone water purifying machine including a reservoir, an ozone generator, an ozone and water supplying device, a baffle unit arranged in feeding relation to the reservoir and having means for receiving fluid from the said supply device and holding the same at different levels whereby upon restarting the operation of the machine after a period of rest the fluid will be compelled to rise from the lower level to the higher level before being discharged to the baffle means of the unit, and means for controlling the supply of raw water and ozone to the said supply device.

12. An ozone water purifying machine including a reservoir, an ozone generator, a mixer device in piped relation with the ozone generator and with the source of water supply, a baffle unit arranged in feeding relation to the reservoir and including a well for receiving the discharge from the mixer, said well being adapted to hold ozone treated water at active and reserve levels whereby upon the starting of the apparatus the fluid discharged from the mixer will be compelled to accumulate in the well from the reserve level to the active level before reaching its normal path of discharge into the portion of the baffle unit leading to the reservoir, and float actuated means for controlling the supply of raw water to the mixer and generation of ozone in the generator.

13. An ozone water purifying machine including a reservoir, an ozone generator, a baffle unit arranged in feeding relation to the reservoir, a mixer device in piped relation to the generator, a raw water supply line also leading to the mixer, an electrically controlled and normally closed flow control valve in the raw water supply line, a resistance switch valve also in the raw water supply line anterior to the flow control valve and electrically connected with the ozone generator, a main switch device, a float within the reservoir responsive to the level of liquid therein and controlling the main switch device, whereby upon the fall of liquid within the reservoir the main switch device will close the electrical circuit to the flow control valve and also to the switch valve to permit the flow of raw water and start the generating action within the generator.

14. An ozone water purifying machine including a reservoir, an ozone generator, a baffle unit arranged in feeding relation to the reservoir, a water and ozone mixer discharging into the baffle unit and in communication with the ozone generator, a raw water supply line communicating with the mixer, and electrically operated flow control valve for the raw water line, a fluid operated switch valve also in the supply line and electrically connected to the ozone generator, and a main switch actuated by the level of purified water in the reservoir for closing an electrical circuit to the flow control valve and switch valve.

15. An ozone water purifying machine including a reservoir, an ozone generator, a raw water supply line, a float controlled main switch device, a flow control valve in the raw water supply line, a switch valve also in the water supply line and electrically connected with the generator, and electrical connections between the main switch device, the flow control valve, and the switch valve.

16. An ozone water purifying machine including a reservoir, an ozone generator, a raw water supply line, a mixer communicating with the raw water supply line and ozone generator, a main switch device supported on the exterior of the reservoir, a flow control valve and a switch valve in the raw water supply line, the latter being electrically connected with the generator, and a float device within the reservoir and connected with the main switch device for actuating the same to close the circuit to the flow control and switch valve.

17. In an ozone water purifying machine the combination with a reservoir and a raw water supply line, of a flow control valve located in the water supply line, a main switch mounted on the exterior of the reservoir and electrically connected with the flow control valve, and a float within the reservoir adapted to ride on the level of liquid therein for controlling the operation of the main switch device.

18. In an ozone water purifying machine the combination with a reservoir, of an ozone generator, a raw water supply line, a flow control valve therein, a switch valve also in the raw water supply line and electrically connected with the generator, and a float controlled main switch device electrically connected with the flow control valve and switch valve.

19. An ozone water purifying machine including a base, a reservoir mounted on the base, an ozone generator also mounted on the base, a baffle unit superposed on the reservoir, a mixer device discharging into the baffle unit and in piped relation to the ozone generator, a raw water supply line communicating with the mixer, a switch valve in the raw water supply line and electrically connected with the ozone generator, a flow control valve also in the raw water supply line, a main switch device controlled by the level of liquid within the reservoir and adapted to close an electrical circuit to the flow control and switch valves.

20. An ozone water purifying machine including a reservoir, a main switch device carried by the reservoir and controlled by the level of liquid therein, a raw water supply line, a flow control valve therein electrically connected with the main switch device, said flow control valve including a casing, a spring seated valve head, a stem fitted to the head and projecting exteriorly of the casing, a solenoid actuated member, a lost motion coupling carried by the solenoid actuated member, and lever means connecting the lost motion coupling with the said stem.

21. An ozone water purifying machine including a reservoir, a raw water supply line, a main switch device controlled by the level of liquid within the reservoir, a solenoid actuated flow controlled valve within the raw water supply line and including a spring pressed valve head having a stem fitted with a disk, a solenoid actuated lost motion coupling loosely engaging the stem, and lever means adapted to be engaged by said lost motion coupling and the disk for causing the positive lifting of the valve from its seat and permitting the same to fall under spring pressure.

22. An ozone water purifying machine including a reservoir, a raw water supply line, a main switch device actuated by the level of liquid in the reservoir, an ozone generator, a switch valve including variable resistance elements and located in the raw water supply line and electrically connected with the ozone generator and also included in the circuit with the main switch device whereby the circuit will also be closed to the resistance elements of the switch valve.

23. An ozone water purifying machine including a reservoir, a raw water supply line, a main switch device controlled by the level of liquid in the reservoir, an ozone generator, a flow controlled valve in the raw water supply line included in circuit with the main switch, a switch valve also in the raw water supply line and consistsing of resistance elements included in the circuit with the main switch and also electrically connected with the generator, said switch valve including a rising and falling valve head and an external pivotally supported switch arm connected with the valve head, a switch block carried by the arm and adapted to move over the said resistance elements to control the current to the generator upon the closing of the circuit by the main switch and the actuation of the flow control valve.

24. An ozone water purifying machine including a reservoir, a baffle unit superposed on the reservoir and including a plurality of baffle sections arranged in stacked relation, each section having a well forming wall portion at one end and an inclined non-oxidizing baffle plate, and the plates of the several units being reversely disposed.

25. An ozone water purifying machine including a reservoir, and a baffle unit superposed thereon and including a plurality of baffle sections, one of which constitutes a base section provided with a flange for sealing the top of the reservoir and also having at one end thereof the bottom of a well forming portion, said base section also including an inclined baffle plate, other baffle sections superposed on the base section and each including a well forming wall portion and baffle plate, and a cover for the stack of baffle sections.

26. An ozone water purifying machine including an ozone generator, the raw water line, a resistance switch valve in said raw water line, and an electrical operating circuit including the resistance switch and the generator.

27. An ozone water purifying machine including an ozone generator, the raw water line, a resistance switch valve operated by the flow through said raw water line, and a float controlled electrical operating circuit including the resistance switch and the generator.

28. An ozone water purifying machine including an ozone generator, the raw water line, a flow control valve for the raw water line, having electrical actuating means, a resistance switch valve included in the raw water line, and an electrical operating circuit including the said electrical actuating means, the resistance switch and the generator.

29. An ozone water purifying machine including an ozone generator, the raw water line, a flow control valve for the raw water line, having electrical actuating means, a resistance switch valve included in the raw water line, and an electrical operating circuit including the said electrical actuating means, the resistance switch, and the generator.

30. An ozone water purifying machine including an ozone generator, the raw water line, a resistance switch valve included in the raw water line, a transformer having one of its windings in the circuit with the generator, and an electrical operating circuit including the resistance switch and the other winding of the transformer.

31. An ozone water purifying machine including an ozone generator, the raw water line, a resistance switch valve included in said raw water line, a transformer having one of its windings connected with the terminals of the generator, and an electrical operating circuit including the resistance switch and the other winding of the transformer and having a fuse and pilot light and interposed between said switch and other winding transformer.

32. An ozone water purifying machine including an ozone generator, the raw water line, a resistance switch valve included in said raw water line and having electrical actuating means, an electrical operating circuit including the resistance switch, the said electrical actuating means and the generator, and a float actuated control switch for said electrical operating circuit.

33. An ozone water purifying machine including an ozone generator, the raw water line, the flow control valve for said raw water line, solenoid actuating means for said flow control valve, and an electrical operating circuit including the generator and said solenoid, and a float actuated control switch for said operating circuit.

34. An ozone water purifying machine including an ozone generator, the raw water line, a flow control valve in said raw water line, solenoid actuating means for said flow control valve, a resistance switch valve in the raw water line anterior to the flow control valve and electrically connected with the generator, and a pressure responsive valve also in the raw water line anterior to the resistance switch valve, and a switch controlled by the said pressure valve and included in the circuit with the solenoid actuating means for said raw water line.

35. An ozone water purifying machine including an ozone generator, the raw water line, a flow control valve in said raw water line having electrical actuating means, a resistance switch valve also in the raw water line, a pressure responsive valve also in the raw water line anterior to said first mentioned valves, a switch controlled by said pressure valve and an electrical operating circuit including said electrical actuating means, the switch controlled by the pressure valve, the resistance switch, and the generator.

36. An ozone water purifying machine including an ozone generator, the raw water line, a flow control valve in said water line having electrical actuating means, a device also in the raw water supply line and responsive to the pressure of water in the source of the raw water supply, a switch electrically connected with the actuating means of the flow control valve and controlled by the said device to open the circuit upon a drop in pressure in the source of water supply.

37. An ozone water purifying machine including an ozone generator, the raw water line, a flow control valve, a switch located in a circuit including the said electrical actuating means, and means responsive to pressure in the source of supply of the raw water line for controlling said switch.

38. An ozone water purifying machine including an ozone generator, the raw water line, a flow control valve for said raw water line, solenoid means for operating said valve, a circuit including the solenoid, a normally closed switch in said circuit, and means responsive to pressure conditions in the raw water line anterior to the flow control valve for operating said switch upon the failure of the water supply for the said raw water line.

39. An ozone water purifying machine including a reservoir, an ozone generator, the raw water line, a mixing device in communication with the raw water line, an ozone conduit in communication with the generator and also with the mixer, and a liquid trap located in the ozone conduit between the generator and the mixer.

40. An ozone water purifying machine including a reservoir, an ozone generator, the raw water line, a mixing device in communication with the raw water line, an ozone conduit leading from the generator to the mixer and means in said conduit for preventing water from the mixing device from entering the same.

In testimony whereof I hereunto affix my signature.

HARRY BUXTON HARTMAN.

Witness:
 EMORY D. GROFF.